May 28, 1935. W. C. WAGNER ET AL 2,002,968
ANTITAMPERING METER
Filed Aug. 16, 1933 2 Sheets-Sheet 2
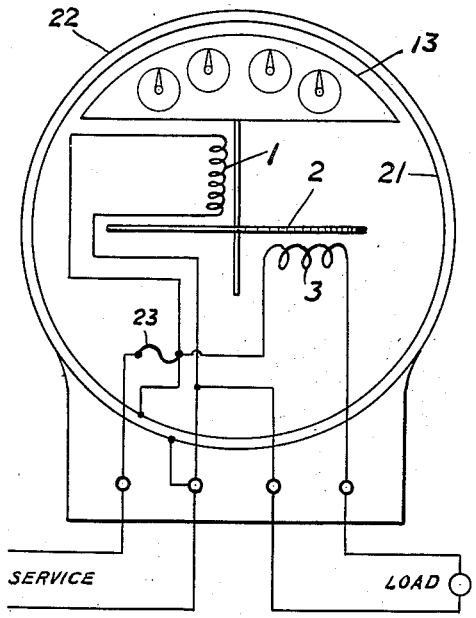
FIG. 4.
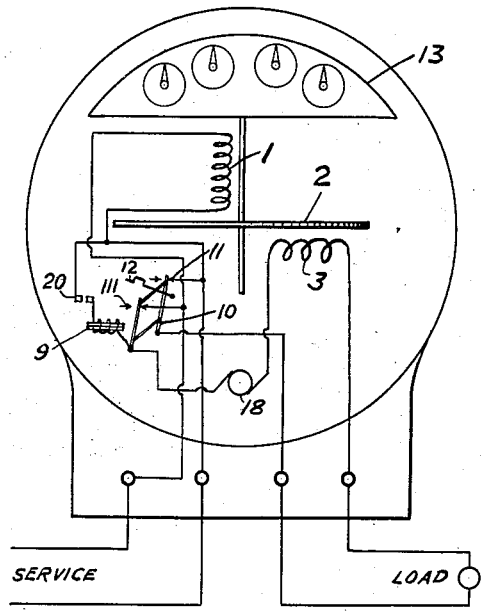
FIG. 6.
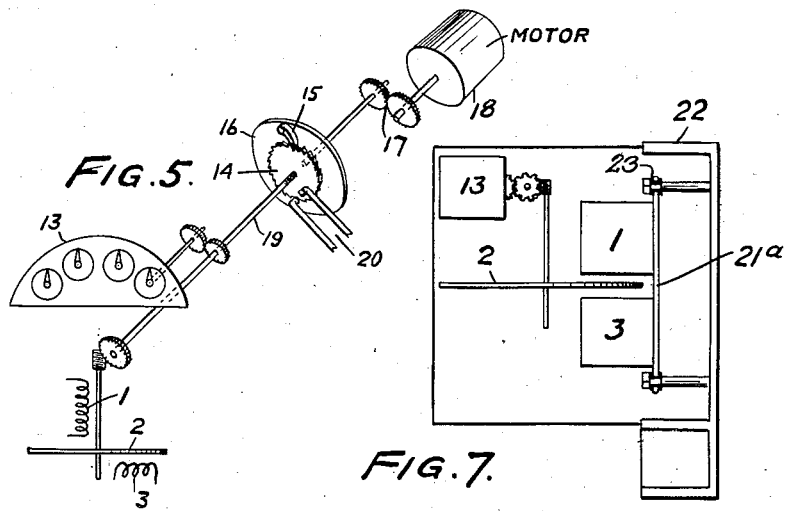
FIG. 5.
FIG. 7.
WITNESS:
Robt P Kitchel
INVENTORS
Walter C. Wagner
George B. Schleicher
BY
Augustus B. Stoughton
ATTORNEY.

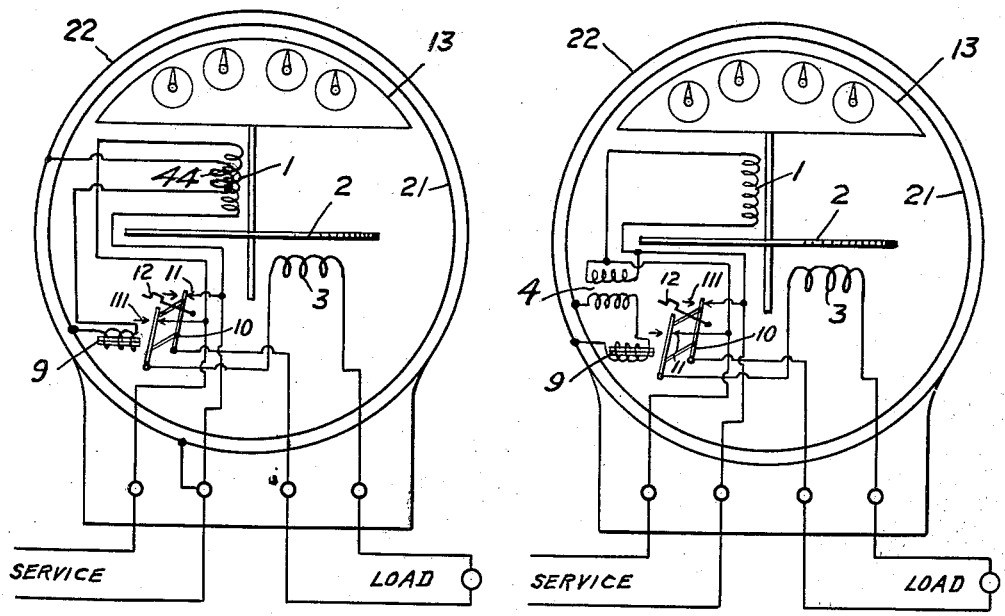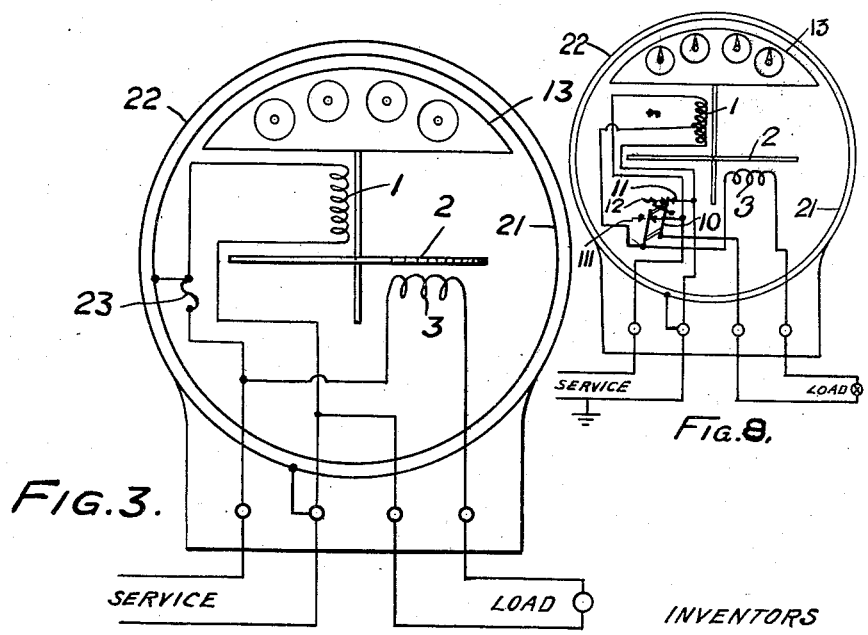

Patented May 28, 1935

2,002,968

UNITED STATES PATENT OFFICE 2,002,968

ANTITAMPERING METER

Walter C. Wagner, Ardmore, Pa., and George B. Schleicher, Clementon, N. J.

Application August 16, 1933, Serial No. 685,403

6 Claims. (Cl. 171—34)

This invention relates to integrating electrical meters, particularly watthour meters, and its object is to make more difficult interference with registration by unauthorized persons. The invention covers new and novel means of protection against the unauthorized stopping of the meter disk while load is being supplied, and against reverse operation of the meter register.

The principles involved are capable of application in various ways, and a number of means of accomplishing the results are given as examples of the principles involved rather than in the form of specific construction details.

In the following description reference will be made to the accompanying drawings forming part hereof and in which Figure 1 is a diagrammatic and somewhat schematic view illustrating a double shell case with line voltage between and a relay to open both sides of the load circuit.

Fig. 2 is a diagrammatic and somewhat schematic view illustrating a double shell case with low voltage, obtained from the secondary of a small transformer, applied between the two parts of the shell, and a relay to open the load circuit. The figure shows the relay arranged to open both sides of the line.

Fig. 3 is a similar view with line voltage between the shells arranged to blow a fuse in the potential circuit of the meter when the meter case is drilled.

Fig. 4 is the same as Fig. 3 except that the fuse within the meter opens the load circuit.

Fig. 5 illustrates an overrunning ratchet mechanism operated by a motor when the meter disk is stopped while load is supplied or when the method of tampering consists of reversing the rotation of the meter disk.

Fig. 6 is a view illustrating the electrical connections of Fig. 5.

Fig. 7 illustrates an alternative arrangement in place of the double cover, and consists of insulating the internal moving and fixed parts of the meter from the base and cover.

Fig. 8 shows an alternative arrangement to Fig. 1, in that the meter potential coil has been provided with taps so that it serves also as an auto-transformer for supplying the required low voltage.

In Figs. 2 to 7, inclusive, a standard potential coil 1 and a current coil 3 of an induction watthour meter are arranged in operative relation to disk 2 which drives register 13.

The relays of Figs. 1, 2, 6, or 8, may be arranged to close a circuit which would operate any desired device; for example, a flasher, buzzer, alarm or light, or they may open the potential circuit of the meter to facilitate the discovery of the tampering due to the absence of registration. Contacts 111 are used to close a circuit, and if this feature is not desired these contacts may be omitted; similarly, when contacts 111 are used contacts 11, which open a circuit, may be omitted and the connections changed accordingly if the interruption of the service is not desired. Both features may be applied if desired. Resetting the relay to normal requires the opening of the meter, and is accomplished by lifting latch 12 which causes armature 10 and contacts 11 to assume their normal position. If the position of the relay within the meter is such that latch 12 is inaccessible to authorized persons an extension of the latch or a simple mechanical linkage (not shown) may be added.

A tampering practice against which protection is advantageous, consists of the unauthorized stopping of the disk. This is generally accomplished by drilling a hole into the meter cover or base and inserting a wire or other obstruction through the hole. A method of protecting a meter against this form of tampering consists in providing the meter with a metal inner or outer shell. Fig. 2 shows such an arrangement using an inner shell. The shell 21 is insulated at all points from the base and cover 22, and a difference of potential obtained from low voltage transformer 4 is applied between the meter base and cover 22, and the shell 21. It is apparent that in attempting to drill through the meter cover or base, the drill will close the circuit from the low-voltage winding of transformer 4 through relay coil 9 causing armature 10 to open contacts 11 which are then held in the open position by latch 12. The secondary voltage is advantageously chosen of a magnitude so that even under favorable conditions it cannot create a hazard for the tamperer, as, for example, 10 volts. It is apparent that the meter potential coil and its core have the characteristics of the primary of a transformer, and hence the addition of an insulated low voltage winding to the potential coil permits the elimination of the separate low-voltage transformer. Fig. 1 shows this arrangement.

The use of the metal shell is not limited to the operation of a relay. Such a shell arranged in accordance with this invention may be used to blow a small fuse 23, Fig. 3, in the potential circuit of the meter, thus causing the meter to stop; or the drilling of the cover may blow a larger fuse 23, Fig. 4, arranged within the meter structure to interrupt the load circuit.

The same principle, applied in a different way, is adaptable to some meters by insulating the grid 21ª, which supports the meter element including parts 1, 2, 3 and 13 from the meter base 22, at all points 23 at which it is supported. In this case the drilling of the cover 22 and the insertion of a wire will cause a relay to operate, or to blow a fuse within the meter either in the potential circuit or in the load circuit as soon as the wire closes the circuit between the outer shell and the meter grid. An example of this arrangement is shown in Fig. 7.

An alternative means of protecting the meter against the stopping of the disk is shown in Figs. 5 and 6 which utilize an overrunning ratchet for closing a contact to operate a relay. In Fig. 5, the meter consists of potential coil 1, disk 2, current coil 3, and register 13. Attached to a shaft of the dial train is a ratchet wheel 14; a pawl or pawls 15 are attached to a wheel, disk or other means of support 16 which is driven through suitable gearing 17 by motor 18. Motor 18 is connected into the current circuit of the meter, and the gearing is arranged so that ratchet wheel 14, and the disk and pawl assembly 15 and 16 normally operate in the same direction. Pawl 15 and wheel 16, however, for all conditions of load rotate at a slower speed than ratchet wheel 14. Hence the meter register may be driven proportionately to the speed of the meter disk under normal conditions, but if meter disk 2 is stopped or reversed while load is being supplied motor 18 will drive pawl 15 against ratchet wheel 14. Ratchet wheel 14 is attached to shaft 19 by means of a thread on shaft 19. Motor 18, therefore, will turn ratchet wheel 14 and move it laterally along shaft 19. The lateral motion of wheel 14 will close contacts 20 which in turn may operate a relay. In the arrangement shown, the motor is connected in series with the current circuit so that it will operate only when load is being supplied. Fig. 6 shows typical electrical connections for the mechanical arrangement whose principle is shown in Fig. 5.

It is apparent that a great variety of combinations is possible in applying the various individual protective features to a particular meter. No attempt has been made to illustrate all possible combinations, or to describe in detail all of the various mechanical arrangements which will serve to utilize the principles disclosed in this invention. It is submitted that the invention relates particularly to new and novel principles of protection, and the mechanical details herein described are intended to serve only as typical examples of practical arrangements which permit the application of these novel principles. The inventive thought of this application however includes all methods of applying these principles to electric meters.

It will be obvious to those skilled in the art that modifications may be made in details of construction and arrangement and in matters of mere form without departing from the spirit of the invention which is not limited to such matters, or otherwise than the prior art and the appended claims may require.

We claim:

1. An induction watthour meter comprising the combination with its operating elements and their circuits of a metal base and cover, an insulated metallic shell and having a voltage applied between said cover and said shell, a low-voltage winding of a transformer for supplying said voltage and a relay interposed in said low-voltage circuit.

2. In the combination of claim 1, the relay having contacts arranged to remain in the closed position after the initial operation of said relay, and means for resetting said relay to its original position.

3. In the combination described in claim 1, the addition of contacts, the relay consisting of at least one coil and a latched armature, arranged so that the said armature operates at least one set of contacts.

4. In an induction watthour meter comprising the combination with its operating elements and their circuits, of the gear train which is driven by the meter, contacts, a motor running at less speed than the gear train, and an overrunning ratchet mechanism interposed between the gear train and the motor, and of which a part is threaded and closes said contacts when the gear train is stopped.

5. The combination described in claim 1 in which the difference of potential between the two component parts is obtained from taps on the potential coil of the meter.

6. In the combination described in claim 1 the difference of potential between the two component parts being obtained from the low-voltage winding of a transformer, said transformer consisting of the potential coil of the meter for its primary winding and a secondary which is an additional winding on the same core as the potential coil of the meter.

W. C. WAGNER.
GEORGE B. SCHLEICHER.